Patented Aug. 22, 1950

2,519,484

UNITED STATES PATENT OFFICE 2,519,484

QUINOLYL SULFONAMIDO COMPOUNDS

Meyer Levitz, New York, N. Y., assignor of one-half to Reginald Auchincloss and Ruth C. Auchincloss, both of New York, N. Y., jointly No Drawing. Application February 4, 1946, Serial No. 645,484

4 Claims. (Cl. 260—239.8)

The present invention is directed to organic compounds, more particularly to derivatives of quininaldehyde and similar substances, and adapted for use in the treatment of certain diseases.

In the treatment of tropical diseases such as malaria, quinine and its derivatives have been found to be particularly effective. For a number of reasons it is highly desirable to provide substitutes for the quinine since at times shortages have developed in the material, and also it is desired to produce substances which are less expensive and which can be controlled by synthetic manufacture so that the product will be uniform at all times.

The present invention has for its objects to provide a series of substances which contain the quinine radical and which are of considerable importance in the treatment of malaria and other and similar infections.

It is also among the objects of the present invention to provide a method of producing such substances which will be simple and effective and which will have a relatively high yield of the desired product.

The substances constituting the subject matter of the present invention may be represented by the following structural formula:

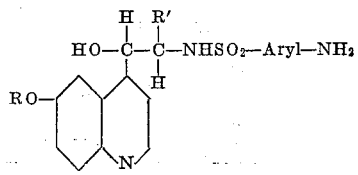

wherein R and R' are hydrogen or alkyl groups having from 1 to 5 carbon atoms, and the NH₂ group may have an acid substituent. RO— may be hydrogen.

The acid substituent may be an inorganic acid such as hydrochloric or sulphuric, to form a hydrochloride or a sulphate; or the acid may be a dibasic organic acid wherein the acid groups are carboxyl radicals or sulphonic radicals. As examples thereof may be mentioned succinic acid and phthalic anhydride. The aryl group may be the ordinary simple benzene ring or may be a benzene ring having hydrocarbon substituents thereon of a small number of carbon atoms, say up to 5. Also, the aryl group may include such radicals as naphthalene, quinoline and carbazole.

In practicing the present invention, the starting material may be a quininaldehyde. The method of manufacture of this substance has been amply described in the literature. The first step in the present process is the treatment of said aldehyde with nitro-ethane. A condensation takes place according to the following equation:

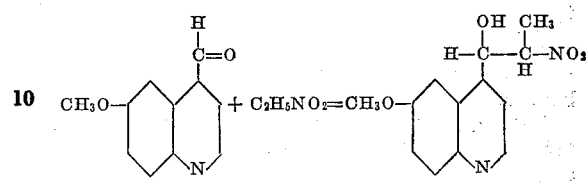

The operation may be conducted as follows:

To 10 g. of 6-methoxy quininaldehyde dissolved in 40 ml. of absolute alcohol and cooled in an ice-water bath, is added 12 ml. of nitroethane and 50 drops of freshly distilled diethylamine. The mixture is seeded with a crystal of the condensation product, since unless crystallization starts promptly, the yield falls off considerably. The solution is allowed to stand for two days at room temperature and then chilled and filtered. The product is washed once with cold ethanol and several times with ether until it is white. Cautious addition of water to the alcoholic filtrate yields a second crop. The condensation product is then subjected to reduction with hydrogen in order to transform the nitro group to an amino group. This may be accomplished by conducting the reaction in the presence of acetic acid and a catalyst consisting of finely divided palladium deposited on carbon, or the following procedure may be used.

Five and eight-tenths grams of the nitro compound is dissolved in 14 ml. of acetic acid and 30 ml. of absolute alcohol and reduced under 30 lbs. pressure by hydrogen in the presence of 1 g. of Raney nickel. Occasional heating to 60° accelerates the process. When no more hydrogen is absorbed, the solution is filtered and the solvents are distilled off under reduced pressure at room temperature.

As a result of the reaction, the following compound is produced:

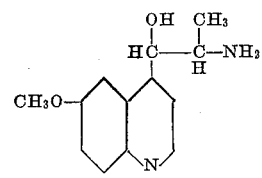

The next step in the reaction is the treatment of the amino reaction product with a chloro-sulphanilide. The reaction which takes place is represented by the following equation:

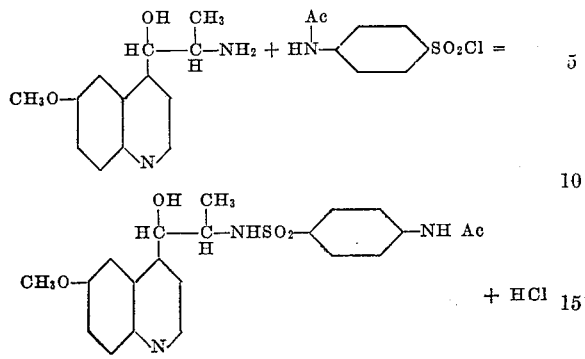

The following procedure may be used. The amino compound is dissolved in water, neutralized with potassium carbonate, and refluxed with 5 g. of acetylsulfanilyl chloride in acetone-aqueous potassium carbonate solution for one and one-half hours. Most of the acetone is then evaporated, water is added, and the crystalline precipitate filtered out. To remove the acetyl group, two grams of the crystalline precipitate is refluxed with twenty-five milliliters of ten percent hydrochloric acid for two hours, diluted with water and neutralized with sodium bicarbonate.

Instead of starting with the methoxy quininaldehyde, one may begin the operation by the use of para-anisidine and react the same with ethyl aceto-acetate according to the following equation:

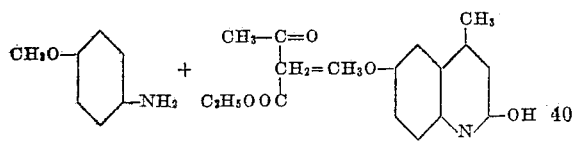

The reaction product may then be treated with phosphorus oxychloride (POCl₃) to substitute a chlorine atom for the hydroxy group. Then it is treated with nascent hydrogen produced by means of a palladium catalyst deposited on carbon, whereby the chlorine is replaced by hydrogen. Then the methyl group is oxidized in the presence of SeO₂ as a catalyst, whereby it is transformed into an aldehyde radical. The compound so formed may be treated as set forth above to give the products of the present invention.

Compounds of the type described herein have been found to have therapeutic value in the same field as quinine has been used heretofore. While the effectiveness per unit weight of the present compounds are not equal to the effectiveness of quinine, they nevertheless have been used successfully without any after effects; nor are the compounds of the present invention habit forming.

Although the invention has been described setting forth a single specific example of the operation thereof, said invention is intended to illustrate the invention and not to limit the same. For instance, in place of the nitro ethane, nitro derivaties of other aliphatic hydrocarbons, preferably of a small number of carbon atoms, say of from 3 to 5, may be substituted therefor. In place of the sulphonamide radical specifically set forth, other sulphonamides may be introduced into the molecule. In those cases where dibasic acid is attached to the amino group, one of the acid groups remains free and it may be neutralized to form a water soluble salt as sodium, ammonium and like salts. These and other changes in the details of the invention may be made within the spirit thereof and the invention is to be broadly construed and not to be limited except by the character of the claims appended hereto.

I claim:

1. Compounds of the group consisting of sulphonamids of the following structural formula:

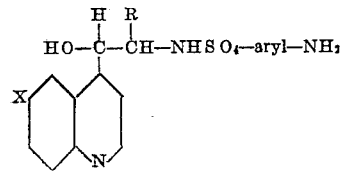

wherein R represents hydrogen and alkyl groups having from 1 to 5 carbon atoms and X represents an alkoxy group, and acid addition salts thereof.

2. Compounds of the group consisting of sulphonamids of the following structural formula:

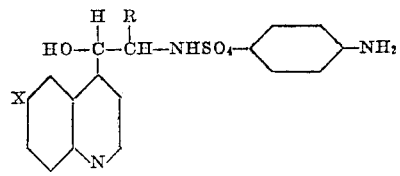

wherein R represents hydrogen and alkyl groups having from 1 to 5 carbon atoms and X represents an alkoxy group, and acid addition salts thereof.

3. Compounds of the group consisting of sulphonamids of the following structural formula:

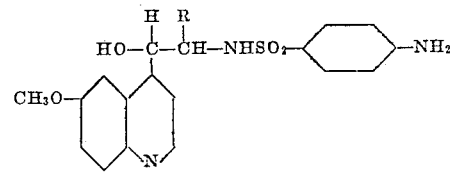

wherein R represents hydrogen and alkyl groups having from 1 to 5 carbon atoms, and acid addition salts thereof.

4. Compounds of the group consisting of sulphonamids of the following structural formula:

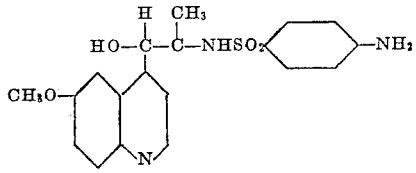

and acid addition salts thereof.

MEYER LEVITZ.

REFERENCES CITED

The following references are of record in the file of this patent:

Wiselogle: "Survey of Antimalarial Drugs," vol. I pages 472 and 473, vol. II, pages 2, 3, and 1240.